Feb. 15, 1966  V. W. HAMPTON ETAL  3,234,891
HIGHWAY VEHICLE WITH RAIL GUIDE WHEEL MEANS
Filed July 25, 1961  3 Sheets-Sheet 1

VERNER W. HAMPTON
NORMAN H.F. RENWICK
GEORGE D. GREEN
THOMAS A. JOHNSON
Inventors By Wenderoth, Lind and Ponack
Attorneys Feb. 15, 1966 V. W. HAMPTON ETAL 3,234,891
HIGHWAY VEHICLE WITH RAIL GUIDE WHEEL MEANS
Filed July 25, 1961 3 Sheets-Sheet 2

VERNER W. HAMPTON
NORMAN H. F. RENWICK
GEORGE D. GREEN
THOMAS A. JOHNSON
Inventors By Henderoth, Lind & Ponack Attorneys VERNER W. HAMPTON
NORMAN H. F. RENWICK
GEORGE O. GREEN
THOMAS A. JOHNSON
Inventors By Nenderath, Lind & Ponack Attorneys

United States Patent Office 3,234,891
Patented Feb. 15, 1966

3,234,891
HIGHWAY VEHICLE WITH RAIL GUIDE WHEEL MEANS
Verner W. Hampton, Norman H. F. Renwick, George D. Green, and Thomas A. Johnson, all of Salisbury, Southern Rhodesia, assignors to Pneuways Development Company (Private) Limited, Salisbury, Southern Rhodesia, a company of Southern Rhodesia
Filed July 25, 1961, Ser. No. 127,463
Claims priority, application Southern Rhodesia, Aug. 26, 1960, 516/60
12 Claims. (Cl. 105—215)

This invention relates to wheeled land vehicles, whether of the tractor or trailer type, such as are widely used on roads for transport purposes.

An object of the invention is the ready adaptation of such vehicles for enabling them, as and when required, to be run upon rail tracks in generally similar fashion to railed vehicles which are primarily, if not wholly, designed for that purpose, examples of which and of the said tracks, e.g. twinrail beams, are shown in applicants' Patent No. 3,119,349, granted January 28, 1964, and patent application Serial No. 127,452, filed July 25, 1961, wherein additional rotational elements, conveniently hereinafter termed "guide wheels," are associated with running or load-carrying wheels for their guidance along the tracks, such, guide wheels cooperating with said surfaces of the elements from which the tracks are constructed, whether as a substantially permanent, semi-permanent, or readily erected and dismantled track system.

A further object of the invention is to provide an outrigger structure for attachment to a vehicle road wheel for effecting lateral guidance when the vehicle is run on a rail-like track having guiding side surfaces, comprising a first member adapted to extend axially outwardly from the road wheel, means to constrain the first member against rotation with the road wheel, an arm member pivotally connected with the first member by an articulation having an axis adapted to be disposed substantially horizontally and parallel to the plane of rotation of the wheel, a guide wheel connected to the arm member for rotation on an axis substantially parallel to the longitudinal direction of the arm member, the pivot point of the guide wheel being spaced from the articulation axis a vertical distance greater than the effective radius of the road wheel, and means for applying a resilient pressure to the guide wheel inwardly about the articulation axis and towards the plane of rotation of the road wheel.

A further object is to provide guide wheel structures suitable for associating as above with dead axle wheels (wheels which rotate about non-rotatable axles) e.g. with the steerable front wheels of a vehicle driven by rearwardly disposed non-sterrable wheels, with a separate outrigger outside of each of the front wheels and mounted so as to extend from the dead stub axles of the respetcive steerable wheels, so that the requisite steering movements thereof may be directly imparted thereto by the respectively associated guide wheels as they follow the path of the rail sides along which they run. In such an arrangement, to accommodate design variations as between the different makes of road vehicles which it is desired to be able to adapt as aforesaid, a degree of standardization in the form and dimensions of wheel stub axles, may be desirable, or alternatively a range of adaptors which may be adjustable adaptors.

A still further object is to provide with live axle or driving road wheels and equally with dead axle wheels, whether steerable or non-steerable, guide wheel-carrying outrigger structures which may be fixed directly to the vehicle wheels.

A further object of the invention is the inclusion of such articulations or the like in the structures aforesaid between the guide wheels which they carry and the points of connections of such structures, whether to vehicle dead or live axles, that the guide wheels may be not only pre-loaded adjustably for varying their grip on the rail sides, but also readily moved, e.g. swung upwardly or downwardly or inwardly or outwardly, between operative positions for the side guidance engagement with the rails and inoperative or stowed positions when the vehicle is to function as an ordinary road vehicle on a non-railed track.

In the accompanying drawings the presently preferred method shown therein of attaching the guide wheels to vehicles is to attach the outrigger structures carrying them to the load-carrying wheels themselves, in such a way, that such structures do not partake of wheel rotation and are suitably restrained to enable the guide wheels to maintain continuous running contact with the outsides of the track rails.

Figure 1:
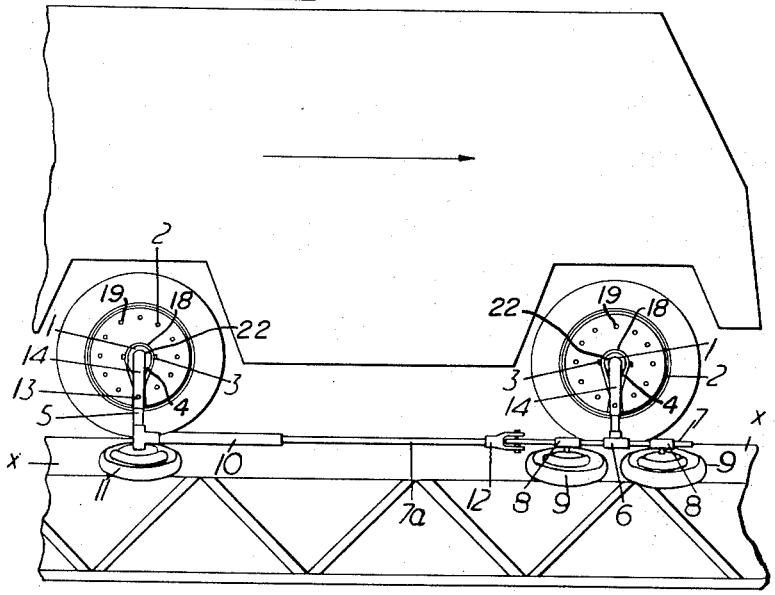
FIGURE 1 shows in side elevation a schematic general assembly of load-carrying and guide wheels of a road vehicle as prepared for running on a suitable track, such assembly using leaf springs for applying resilient grip between the guide wheels and the rails.
Figure 2:
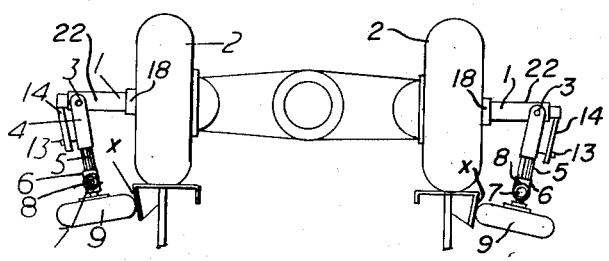
FIGURE 2 is a part end elevation corresponding to FIGURE 1.
Figure 3:
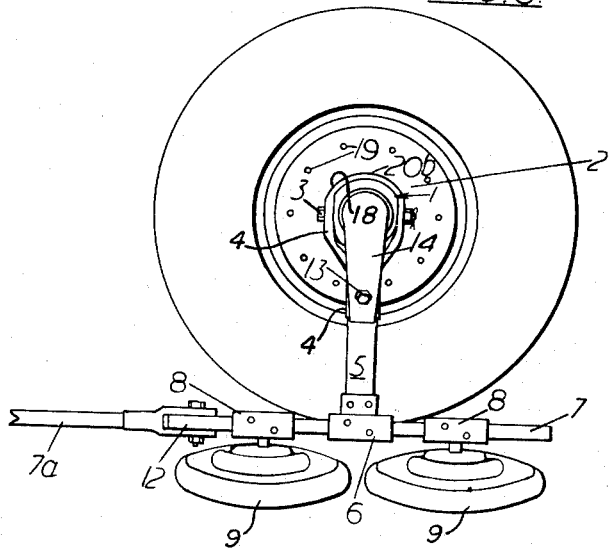
FIGURE 3 is a larger scale and more detailed view of the steerable or front wheel assembly appearing in FIGURE 1.
Figure 4:
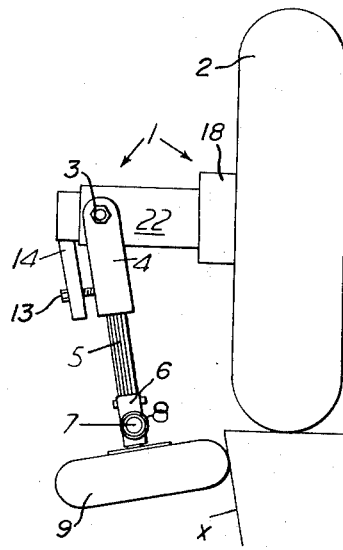
FIGURE 4 is a front elevation corresponding to FIGURE 3.

Referring to FIGURES 1 to 4, the structure denoted generally by reference numeral 1 is attached coaxially, but not rotatably, with the nave or hub of the wheel 2 and presents a diametrically disposed trunnion 3 near its outer end for an arm 4 of box section forked at its upper end and containing, so as to project from its lower end, a pack of leaf springs 5 having at its free end a T-piece 6.

The axis of the cross-part of the T-piece lies parallel to the plane of rotation of the wheel 2 and a rod or tube 7 fixed through it carries, in front of and behind the arm 4 on a pair of collars or the like 8, respectively two guide wheels 9. These latter wheels are loaded inwardly as hereinafter explained into resilient running contact with the sides of the track rails denoted by reference $x$. The rearward continuation 7a of the rod or like 7, coupled through a sliding (telescopic) joint at 10 with a single guide wheel 11 in line with the rear wheel and supported thereby in like manner to that above-described, provides a torque reaction system constraining the guide wheels against rotation with the wheels 2. The telescopic joint 10 enables the system to be adapted easily to different wheel bases. A fork joint in the length of the torque reaction system and shown at 12, with its pivotal axis parallel to the arms 4, is so positioned as to accommodate steering movements of the front guide-wheel-load-carrying wheel assemblies which movements derive from curvatures encountered by the guide wheels in running along the track sides.

The inward preloading of the guide wheels is obtained, in the example shown in FIGURES 1 to 4, by inward thrust on the arm 4 of a bolt 13 or other adjustable abutment presented by a downwardly directed fixed arm 14 at the end of the mounting structure 1.

Figure 5A:
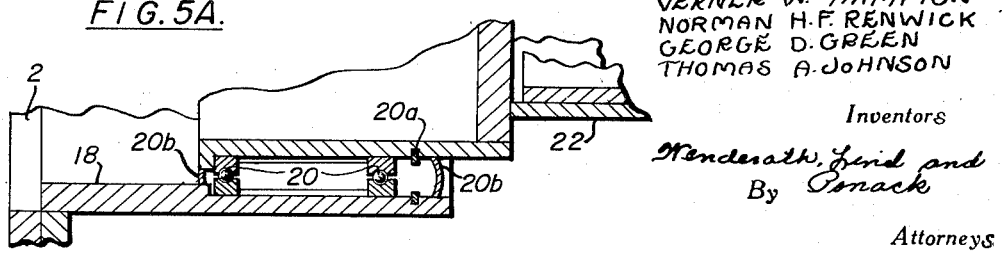
FIGURE 5A is an enlarged view of a detail of FIG. 5.
Figure 5:
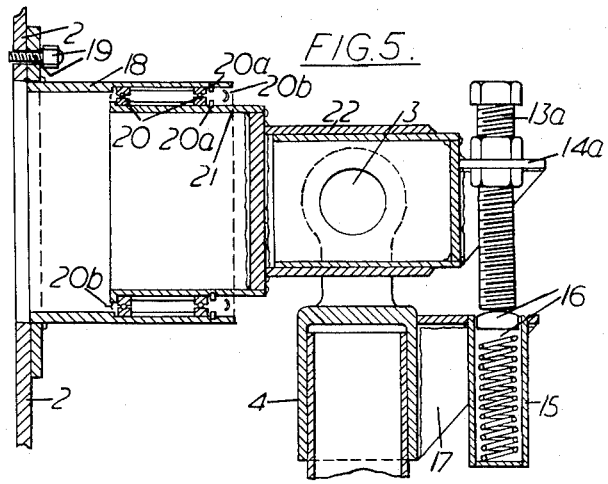
FIGURE 5 is an axial sectional elevation showing the connections between a guide wheel assembly and a load-carrying wheel, this figure serving also to show means of pre-loading the guide wheels, alternative to the leaf springs of FIGURES 1 to 4.
Figure 6:
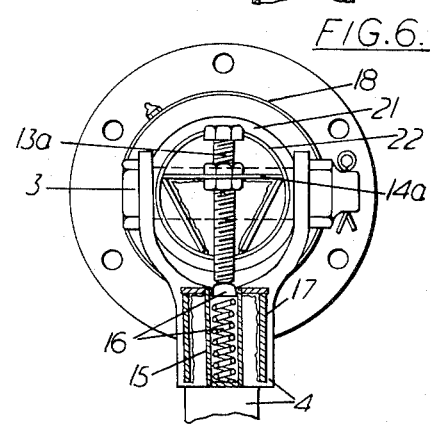
FIGURE 6 is a part-sectional end elevation corresponding to FIGURE 5.

In the alternative shown in FIGURES 5 and 6, guide wheel preloading is obtained from an adjustment bolt 13a carried by a bracket 14a at the end of the wheel mounted structure, which bolt thrusts on the guide wheel arm 4 through a spring or other resilient preload retainer device shown at 15, 16, mounted by a bracket 17 on the outside of the arm 4, which latter in this example may be of wholly rigid nature, i.e., without a leaf-spring extension.

Adverting now to the construction of the device indicated up to this point by general reference to numeral 1, and turning again to FIGURES 5 and 6, this device comprises a series of coaxially disposed hollow tubular members, of which the largest diameter one, 18, is flanged and fixed by nuts and studs at 19 to the load-carrying wheel 2. Conventional anti-friction journal and end thrust bearings diagrammatically indicated at 20 within the member 18, retained as by conventional circlips diagrammatically indicated at 20a and enclosed with conventional oil seals diagrammatically indicated at 20b, support the member 21 rotationally. The member 21 is extended axially outwards to the desired distance by the third member 22 which presents diametrically the guide wheel arm trunnion at 3 and carries at its end the aforementioned preload adjustment bolt bracket 14a (or its equivalent arm 14 in FIGURES 1 to 4).

The effective reach of the hollow tubular members 18, 21 and 22 from the wheel to enable the guide wheels to contact the rail sides in the required manner may be adjustable as by forming the member 22 in telescopable sleeves as shown, which can be fixed to any desired overall lengths.

Figure 7:
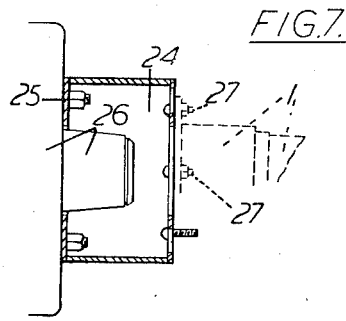
FIGURE 7 is an axial section showing a hub adaptor.

In FIG. 7 a hub adaptor to allow for differences of gauge which constitutes the external distance between the rails of the guiding side surfaces of the rails takes the form of a cylindrical box member 24 of any desired length, fixable by the inturned flange 25 to the wheel hub or brake drum 26 and presenting from another inturned flange at its free end stubs 27 for mounting the guide wheel supporting structure as indicated by the general reference 1.

The articulation provided by the fork and trunnion connection at 3 embodied in the outrigger assembly also affords, or can be arranged with minor modifications of associated parts in its vicinity to afford, an axis about which, with the assembly fixed to the road wheel, the guide wheels can be turned outwardly and upwardly into a stowed position at the sides of the vehicles until the latter are placed on the rails and the guide wheels are to be brought down into use.

Having now particularly described and ascertained our said invention and in what manner the same is to be performed we declare that what we claim is:

1. A vehicle road wheel and guiding means comprising a wheel, a member attached to said wheel for rotation therewith, bearings located in said member, a second member mounted in said bearings, a pivotal connection in said second member disposed substantially horizontally and parallel to the plane of rotation of said wheel, an arm mounted in said pivotal connection, a guide wheel connected to said arm for rotation on an axis substantially parallel to the longitudinal direction of said arm and biassing means for applying a resilient pressure to said guide wheel inwardly about said axis and towards the plane of rotation of said wheel.

2. A vehicle road wheel and guiding means as claimed in claim 1, wherein means are provided to prevent rotation of said second member comprising a torque reaction system including a rod adapted to extend between said arm and the arm of a second, similar structure for attachment to another wheel on the same side of the vehicle.

3. A vehicle road wheel and guiding means as claimed in claim 1, wherein said second member is adapted to be attached to the dead axle of a wheel which is rotatable about the axle of the wheel.

4. A vehicle road wheel and guiding means as claimed in claim 1, wherein said second member comprises two coaxial tubular members arranged for relative axial rotation, one of said tubular members being connected to said arm, and means for attaching the other tubular member to said wheel.

5. A vehicle road wheel and guiding means as claimed in claim 1, wherein said pivotal connection comprises a fork and trunnion connection between said second member and said arm.

6. A vehicle road wheel and guiding means as claimed in claim 1, wherein said biassing means comprises abutments on said arm member and said second member and a resilient element interposed between said abutments.

7. A vehicle road wheel and guiding means as claimed in claim 6, wherein said resilient member is adjustable in effective length.

8. A vehicle road wheel and guiding means as claimed in claim 1, wherein two guide wheels are connected to said arm in symmetrical arrangement about its length by a member extending parallel to the plane of rotation of said wheel.

9. A vehicle road wheel and guiding means as claimed in claim 2, in which said torque reaction system includes within its length an articulation having an axis substantially parallel to said arm between which said system extends.

10. A vehicle road wheel and guiding means as claimed in claim 9, wherein said torque reaction system includes between its end means accommodating variations in the distance between the arms of said two structures.

11. A vehicle road wheel and guiding means as claimed in claim 1, wherein said pivotal connection provides for an angular outward movement of said arm with respect to said second member so that said guide wheel may be stowed in an inoperative position.

12. A vehicle road wheel and guiding means as claimed in claim 1, comprising gauge adaptor means located between said pivotal connection and the plane of rotation of said wheel.

References Cited by the Examiner

UNITED STATES PATENTS

| | | | |
|---|---|---|---|
| 233,989 | 11/1880 | Cowles | 105—169 X |
| 395,073 | 12/1888 | Paige | 105—145 X |
| 456,103 | 7/1891 | Turner et al. | 105—145 X |
| 488,156 | 12/1892 | Turner | 105—144 X |
| 494,081 | 3/1893 | Pruyn | 105—145 X |
| 667,966 | 2/1901 | Brown | 105—145 X |
| 723,024 | 3/1903 | Rees | 105—145 X |
| 750,247 | 1/1904 | Beecher | 105—145 |
| 917,525 | 4/1909 | Belden | 104—247 |
| 1,043,793 | 11/1912 | Barnes | 105—145 |

(Other references on following page)

UNITED STATES PATENTS

| | | | |
|---|---|---|---|
| 1,257,146 | 2/1918 | Stevenson | 105—145 |
| 1,501,060 | 7/1924 | Miller | 104—247 |
| 1,602,066 | 10/1926 | Burton | 104—247 |
| 1,859,832 | 5/1932 | MacKenzie | 105—215 X |
| 2,101,024 | 12/1937 | Heinze | 105—215 |
| 2,115,466 | 4/1938 | Newton | 105—215 |
| 2,836,129 | 5/1958 | Jaeger | 105—148 |
| 2,977,892 | 4/1961 | Ihmig | 104—120 X |
| 3,017,838 | 1/1962 | Bingham | 104—120 |
| 3,050,016 | 8/1962 | Fischer | 105—215 X |

FOREIGN PATENTS

| | | |
|---|---|---|
| 242,788 | 11/1960 | Australia. |
| 1,261,641 | 4/1961 | France. |
| 328,343 | 5/1930 | Great Britain. |

ARTHUR L. LA POINT, *Primary Examiner.*

JAMES S. SHANK, LEO QUACKENBUSH, *Examiners.*